US012302057B1

(12) United States Patent
Chen et al.

(10) Patent No.: US 12,302,057 B1
(45) Date of Patent: May 13, 2025

(54) ADAPTIVE VIRTUAL MICROPHONE FOR EARBUDS

(71) Applicant: Apple Inc., Cupertino, CA (US)

(72) Inventors: Hanchi Chen, Cupertino, CA (US); Martin Kuster, Los Gatos, CA (US); Tom-Davy W. Saux, Los Gatos, CA (US); Victoria Chiu, Emerald Hills, CA (US)

(73) Assignee: Apple Inc., Cupertino, CA (US)

(*) Notice: Subject to any disclaimer, the term of this patent is extended or adjusted under 35 U.S.C. 154(b) by 321 days.

(21) Appl. No.: 17/855,132

(22) Filed: Jun. 30, 2022

Related U.S. Application Data

(60) Provisional application No. 63/237,792, filed on Aug. 27, 2021.

(51) Int. Cl.
*H04R 1/10* (2006.01)
*G10K 11/178* (2006.01)

(52) U.S. Cl.
CPC ..... *H04R 1/1083* (2013.01); *G10K 11/17825* (2018.01); *G10K 11/17833* (2018.01); *G10K 11/17854* (2018.01); *H04R 1/1016* (2013.01); *H04R 2460/01* (2013.01)

(58) Field of Classification Search
CPC ................ H04R 1/1083; H04R 1/1016; H04R 2460/01; G10K 11/17825; G10K 11/17833; G10K 11/17854
USPC ........................................................ 381/71.6
See application file for complete search history.

(56) References Cited

U.S. PATENT DOCUMENTS

| | | | | |
|---|---|---|---|---|
| 8,189,799 | B2 | 5/2012 | Shridhar et al. | |
| 9,369,798 | B1 * | 6/2016 | Alderson | G10K 11/17857 |
| 9,516,407 | B2 | 12/2016 | Goldstein et al. | |
| 11,355,096 | B1 | 6/2022 | Gandhi | |
| 2012/0308028 | A1 * | 12/2012 | Kwatra | G10K 11/17854 381/71.11 |
| 2014/0044275 | A1 * | 2/2014 | Goldstein | H04R 1/1083 381/71.6 |
| 2014/0093090 | A1 | 4/2014 | Bajic et al. | |
| 2015/0243271 | A1 * | 8/2015 | Goldstein | G10K 11/17854 381/71.6 |
| 2022/0343886 | A1 * | 10/2022 | McCutcheon | G10K 11/17854 |

* cited by examiner

*Primary Examiner* — Carolyn R Edwards
*Assistant Examiner* — Friedrich Fahnert
(74) *Attorney, Agent, or Firm* — Aikin & Gallant, LLP

(57) ABSTRACT

Disclosed are systems and methods for adaptive noise cancellation (ANC) at a virtual microphone located at the eardrum of a wearer of an earphone. The techniques estimate the level of leakiness of ambient noise in the earphone from the magnitude of the gain of the transfer function of the feed forward loop filter of the ANC. Based on the estimated leakiness, the techniques estimate the transfer function of the feed forward loop filter to compensate for the difference in the effect of noise cancellation at the virtual microphone and error microphone. A bias term that represents the difference in the frequency response of the attenuated noise at the virtual and error microphone may be added to the adaptive feed forward algorithm. The ANC operation may apply the bias term to the adaptive feed forward loop filter to reduce the ambient noise at the eardrum rather than at the error microphone.

18 Claims, 8 Drawing Sheets

ADAPTIVE VIRTUAL MICROPHONE FOR EARBUDS

CROSS REFERENCE TO RELATED APPLICATIONS

This application claims the benefit of U.S. Provisional Application No. 63/237,792 filed on Aug. 27, 2021, the disclosure of which is incorporated herein by reference in its entirety.

FIELD

This disclosure relates to the field of audio communication, including to digital signal processing techniques designed to cancel or minimize ambient noise heard by wearers of personal audio output devices. Other aspects are also described.

BACKGROUND

Wearable audio output devices such as headphones, earbuds, earphones, etc., are widely used to provide music and other audio content to users, or when users are participating in telephony calls while minimizing disturbance to those nearby. Users may prefer the ultra-slim profile of in-ear devices such as earbuds, or the comfort of on-ear devices such as earphones or headphones. Unwanted ambient noise may be heard by users of the devices either through controlled leakage paths designed to reduce occlusion of desirable ambient sound or unintended leakage paths through imperfect seal such as in-ear rubber tips, on-ear cushions, or around-the-ear coverings designed to provide various amounts of passive noise isolation against ambient noise. The leakage paths may also degrade the quality of the audio content. It is desirable to reduce unwanted ambient noise or mitigate degradation to the quality of audio content heard by the users.

SUMMARY

Disclosed are aspects of methods and systems for performing adaptive noise cancellation or active noise control (ANC) operations to reduce or minimize unwanted ambient noise estimated to appear at the eardrum of a wearer of an in-ear or on-ear earphone. ANC aims to cancel the unwanted ambient noise by adaptively controlling an anti-noise signal driven from a speaker of the earphone so that the anti-noise signal may destructively interfere with the unwanted noise as detected by an error microphone. The ambient noise may leak into the ear canal of the wearer due a leakage path intentionally introduced into the earphone to reduce occlusion effects or to ensure consistent bass response across users. In other scenarios, the ambient noise may be attributable to the imperfect seal formed between the ear-tip of the earphone and the ear canal of the wearer. ANC operations that aim to optimize the attenuation of ambient noise at the error microphone may not minimize the noise actually heard by the wearer of the earphone. This is because the residual or error noise signal that is detected by the error microphone resulting from the destructive interference of the anti-noise and leaked ambient noise, and used by the ANC to adjust the anti-noise, is not detected at the eardrum where the user is actually experiencing the ambient noise. For example, due to the acoustic pressure drop across a housing mesh between the error microphone and the eardrum used to protect the earphone against environmental ingress, there may be a mismatch in the acoustic path transfer function from the error microphone to the eardrum between the anti-noise and the leaked ambient noise, resulting in a discrepancy between the error noise signal detected by the error microphone and by the eardrum. When the earphone is loosely worn to increase comfort, the mismatch of the acoustic path transfer functions between the anti-noise and the leaked ambient noise may increase, significantly affecting the performance of the ANC as heard by the user if uncompensated. Aspects of the disclosure modify the ANC operation to determine the anti-noise or the error noise signal that minimizes unwanted ambient noise at the eardrum.

In one aspect, the ANC operation may estimate the attenuation of the noise signal due to the ANC at the eardrum based on a model of the acoustic relationship between the error microphone and the eardrum. The model may capture the mismatch of the transfer function between the acoustic path for the anti-noise from the error microphone to the eardrum and the acoustic path for the leaked noise to be attenuated from the ear-tip of the earphone to the eardrum. The anti-noise generated by the ANC may be a function of the amount of the leaked noise. By evaluating parameters of the control loop used to generate the anti-noise to cancel the leaked noise at the error microphone and knowledge of the acoustic relationship between the error microphone and the eardrum, the ANC operation may estimate the difference between the attenuated noise at the eardrum and the attenuated noise at the error microphone. The ANC operation may compensate for the estimated difference, so that the noise cancellation may be effectively optimized at the eardrum, rather than at the microphone. In effect, a "virtual" microphone located at the eardrum may be implemented by the control loop of the ANC to adaptively reduce or minimize the unwanted ambient noise actually heard by the wearer of the earphone.

In one aspect, the control loop of the ANC operation to attenuate the leaked noise at the virtual microphone located at the eardrum (i.e., a hypothetical microphone detecting the leaked noise predicted to occur at the eardrum) may include a feed forward topology and an optional feedback topology. The control algorithm of the feed forward loop may control an adaptive filter that processes the ambient noise captured by a reference microphone located externally on the earphone. The control algorithm of the feedback loop may control an adaptive filter that processes the error noise captured by the error microphone located in the housing of the earphone. The outputs of the adaptive filters of the feed forward loop and the feedback loop may be summed to generate the anti-noise signal to drive the speaker. However, instead of targeting to minimize the attenuated noise resulting from the destructive interference of the anti-noise signal and the leaked noise at the error microphone, the adaptive filter of the feed forward loop may be adapted using a least mean-squared (LMS) algorithm to estimate and to minimize the attenuated noise at the virtual microphone located at the eardrum.

In one aspect, the maximum attenuation of the noise achievable at the eardrum across the audio frequencies of interest may be a function of the amount of the leaked noise, and may be modeled as a difference in the transfer function of the acoustic path for the anti-noise from the error microphone to the eardrum and the transfer function for the acoustic path for the leaked noise from the passive noise isolation of the ear-tip of the earphone to the eardrum. The feedback loop does not affect the maximally attenuated noise at the eardrum. The attenuated noise at the error microphone may also be a function of the amount of the leaked noise. The difference between the maximally attenuated noise at the eardrum and the attenuated noise at the error microphone may be considered a bias to be applied to the adaptive filter of the feed forward loop to minimize the noise at the eardrum.

In one aspect, the ANC operation may determine the bias of the adaptive filter of the feed forward loop estimated to minimize the noise at the eardrum based on the magnitude of the gain of the adaptive filter adapted to minimize the noise at the error microphone. The magnitude of the gain of the adaptive filter may be an indication of the amount of noise leakage. The ANC operation may estimate the amount of the noise leakage from the magnitude of the gain, and may estimate a bias to be applied to the gain. In one aspect, the bias may be applied to the noise signal captured by the reference microphone to generate an explicit bias term that is added to the output of the adaptive filter of the feed forward loop to drive the speaker. To keep the LMS algorithm from removing this introduced bias to the feed forward loop, the bias may be multiplied with the estimated transfer function from the speaker to the error microphone to estimate the introduced bias received by the error microphone. The ANC operation may subtract this estimated bias at the error microphone from the error signal before the error signal is injected into the LMS algorithm so that the error signal converges to zero despite the introduced bias. In one aspect, the explicit bias is not added to the output of the adaptive filter of the feed forward loop but the LMS algorithm is still injected with the error signal modified by the estimated bias at the error microphone. The LMS algorithm may then adaptively change the gain of the adaptive filter of the feed forward loop to include the bias to attempt to remove the introduced bias from the error signal.

In one aspect, to apply the bias to the adaptive filter of the feed forward loop, the ANC operation may estimate the attenuated noise at the eardrum resulting from the mismatch between the transfer function of the acoustic path for the leaked noise and the transfer function of the acoustic path for the anti-noise from the error microphone to the eardrum. The ANC operation may estimate the amount of the noise leakage from the magnitude of the gain of the adaptive filter of the feed forward loop, and may estimate the two transfer functions based on the estimated noise leakage. The ANC operation may estimate the attenuated noise at the eardrum based on the estimates of the two transfer functions. The error signal from the error microphone may be modified to generate the estimated attenuated noise at the eardrum to inject the modified error signal into the LMS algorithm. The LMS algorithm may then adaptively change the gain of the adaptive filter of the feed forward loop to apply the bias to attempt to remove the estimated attenuated noise at the eardrum.

In one aspect, a method of adaptively reducing or minimizing the unwanted ambient noise at a virtual microphone located at the eardrum of a wearer of an earphone using a feed forward control loop of an ANC operation is disclosed. The method may include the ANC operation generating an anti-noise signal from ambient noise captured by a reference microphone of the earphone using an adaptive feed forward filter to compensate for the ambient noise received at an error microphone of the earphone. The method also includes estimating an amount of leakage of the ambient noise based on the adaptive feed forward filter. The method further includes determining a bias term for the adaptive feed forward filter based on the estimated level of noise leakage. The bias term may represent the difference in the gain of the adaptive feed forward filter when the ANC operation targets the attenuation of the ambient noise at the eardrum of the wearer of the earphone rather than at the error microphone. The method further includes applying the bias term to the adaptive feed forward filter to adaptively change the anti-noise signal generated by the adaptive feed forward filter to reduce the ambient noise at the eardrum of the wearer.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
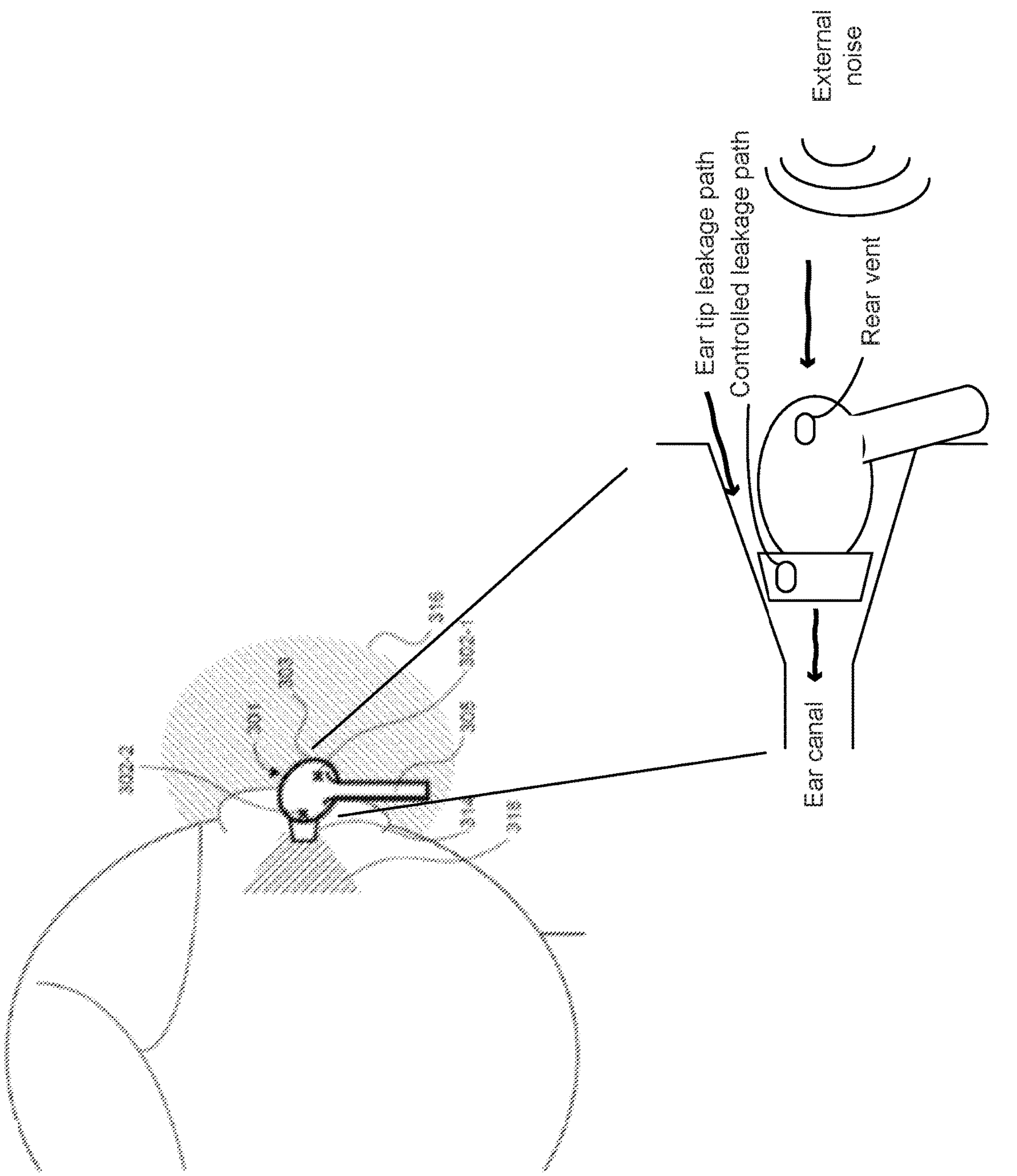
FIG. 1 depicts use of an earphone in which ambient sound may leak in through a rear vent, a controlled leakage path, or the passive isolation formed between the ear-tip of the earphone and the ear canal of a user according to one aspect of the disclosure.

Wearable audio output devices (e.g., in-ear headphones or earbuds, over-the-ear headsets, etc.), which may be collectively referred to as earphones, may operate in a number of different modes. In one mode, when an earphone is not used to stream media content such as music, audio programs, etc., or is not used to communicate responses to voice queries, voice from a remote party in telephony or video calls, etc., the earphone may allow the wearer to hear the ambient sound. For example, the earphone may pass through to the eardrum ambient sound that leaks through a controlled leakage path or ambient sound that has been attenuated due to the physical obstruction of the earphone in the wearer's ear. The controlled leakage path may be used to reduce the occlusion of the ambient sound due to the physical obstruction of the earphone in the wearer's ear or may be used to provide a more consistent bass response for various wearers. Alternatively, the earphone may capture the ambient sound using a microphone and amplify the sound for playback through a speaker. On the other hand, when the earphone is streaming media content or used in voice communication, the earphone may activate signal processing techniques such as ANC to attenuate the unwanted ambient sound or noise to prevent it from interfering with the playback of the media content.

ANC aims to cancel the unwanted noise by adaptively generating and driving from a speaker of the device an electronically controlled sound field, also referred to as an anti-noise signal or simply anti-noise, that has the proper pressure amplitude and phase so it destructively interferes with the unwanted noise. An error sensor such as an error microphone in the device housing may act as a proxy for the eardrum of the wearer to detect any residual or error noise resulting from the destructive interference of the anti-noise with the unwanted noise. A control loop of the ANC may adaptively adjust the anti-noise based on the detected error noise to minimize the ambient noise heard by the user. However, the performance of the ANC and the resulting listening experience may vary as a result of a difference in the acoustic transfer functions from the error microphone to the eardrum between the anti-noise and the noise due factors such as a housing mesh between the error microphone and the eardrum, the way the audio output devices are worn by users, the different shapes of the users' ear canals, the movement of the audio output devices due to the motions of the users, etc.

For example, due to the physical gap between the error microphone located in the housing of the earphone and the eardrum, and the acoustic effect introduced by the housing mesh at the ear-tip, the attenuated noise impinging on the eardrum may be different from the error noise at the error microphone whose minimization is targeted by the ANC operation. That is, the error noise detected by the error microphone and used by the ANC operation to control the anti-noise may not be the attenuated noise heard by a user. The difference between the attenuated noise at the eardrum and the error noise at the error microphone may be a function of the amount of loss of the acoustic pressure of the anti-noise across the housing mesh and the level of leakiness of the earphone. The level of leakiness may in turn depend on the characteristics of the controlled leakage path and the loose-fitting manner in which the earphone is worn. The performance of the ANC at the eardrum is thus sensitive to the amount of pressure drop of the anti-noise across the housing mesh and the amount of leakage of the ambient noise into the ear canal.

Aspects of the disclosure estimates the level of leakiness of the earphone from the magnitude of the gain of the transfer function of the feed forward loop filter of the ANC operation. Based on the estimated leakiness, the ANC operation may estimate the transfer function of the feed forward loop needed to compensate for the difference in the channel response of the ear canal to the ambient noise and the anti-noise signal at the eardrum and at the error microphone. A bias term that represents the difference in the frequency response of the attenuated noise at the eardrum and the error microphone may be added to the adaptive feed forward algorithm. The ANC operation may apply the bias term to the adaptive feed forward loop filter to compensate the difference in the frequency response between the eardrum and the error microphone. Advantageously, the ANC operation may minimize the ambient noise at a virtual microphone located at the eardrum rather than at the error microphone.

In the following description, numerous specific details are set forth. However, it is understood that aspects of the disclosure here may be practiced without these specific details. In other instances, well-known circuits, structures and techniques have not been shown in detail in order not to obscure the understanding of this description.

The terminology used herein is for the purpose of describing particular aspects only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the elements or features in use or operation in addition to the orientation depicted in the figures. For example, if a device containing multiple elements in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and "comprising" specify the presence of stated features, steps, operations, elements, or components, but do not preclude the presence or addition of one or more other features, steps, operations, elements, components, or groups thereof.

The terms "or" and "and/or" as used herein are to be interpreted as inclusive or meaning any one or any combination. Therefore, "A, B or C" or "A, B and/or C" mean any of the following: A; B; C; A and B; A and C; B and C; A, B and C." An exception to this definition will occur only when a combination of elements, functions, steps or acts are in some way inherently mutually exclusive.

FIG. 1 depicts use of an earphone in which ambient sound may leak in through a rear vent, a controlled leakage path, or the passive isolation formed between the ear-tip of the earphone and the ear canal of a user according to one aspect of the disclosure. The earphone 301 includes an earbud 303, stem 305, and ear-tip 314. The earphone 301 is worn by the user such that earbud 303 and ear-tip 314 are in the user's left ear. Ear-tip 314 extends at least partially in the user's ear canal. In one use case, when earbud 303 and ear-tip 314 are inserted into the user's ear, a seal may be formed between ear-tip 314 and the user's ear so as to isolate the user's ear canal from the surrounding physical environment. In other use cases, earbud 303 and ear-tip 314 together block some, but not necessarily all, of the ambient sound in the surrounding physical environment from reaching the user's ear. In other use cases, the ambient sound may leak through a controlled leakage path used to reduce the occlusion effect of the earphone or to provide a more consistent bass response across users.

A first microphone or a first array of microphones 302-1 is located on earphone 301 to capture the ambient sound that may emanate from region 316 of a physical environment surrounding the user. Microphone 302-1 may be a reference microphone located externally on earphone 301 to detect the ambient sound for processing as a reference signal by the ANC operation. A second microphone or a second array of microphones 302-2 is located inside the housing of earphone 301 to act as an error microphone to capture residual or error noise signal resulting from the destructive interference of the anti-noise signal from the ANC operation and ambient sound that has leaked into the user's ear. The error noise signal maybe heard in a region 318 inside the user's ear canal. A magnified view of earphone 301 shows that the ambient sound or external noise may enter the ear canal from multiple paths such as through a rear vent on the exteriorly exposed side of earbud 303 in addition to the leakage through the seal at ear-tip 314. The ambient sound may also enter earphone 301 through a controlled leakage path at the tip of ear-phone 301. In one aspect, the leakage through the controlled leakage path may dominate over the leakage through the rear vent and may be comparable to the parasitic leakage due to the imperfect seal of the earphone 301 against the ear canal when earphone 301 is loosely worn. Conversely, the anti-noise signal from the ANC operation may leak out through the controlled leakage path. In one aspect, the error microphone may be used to capture the near-field speech signal of the user.

Figure 2:
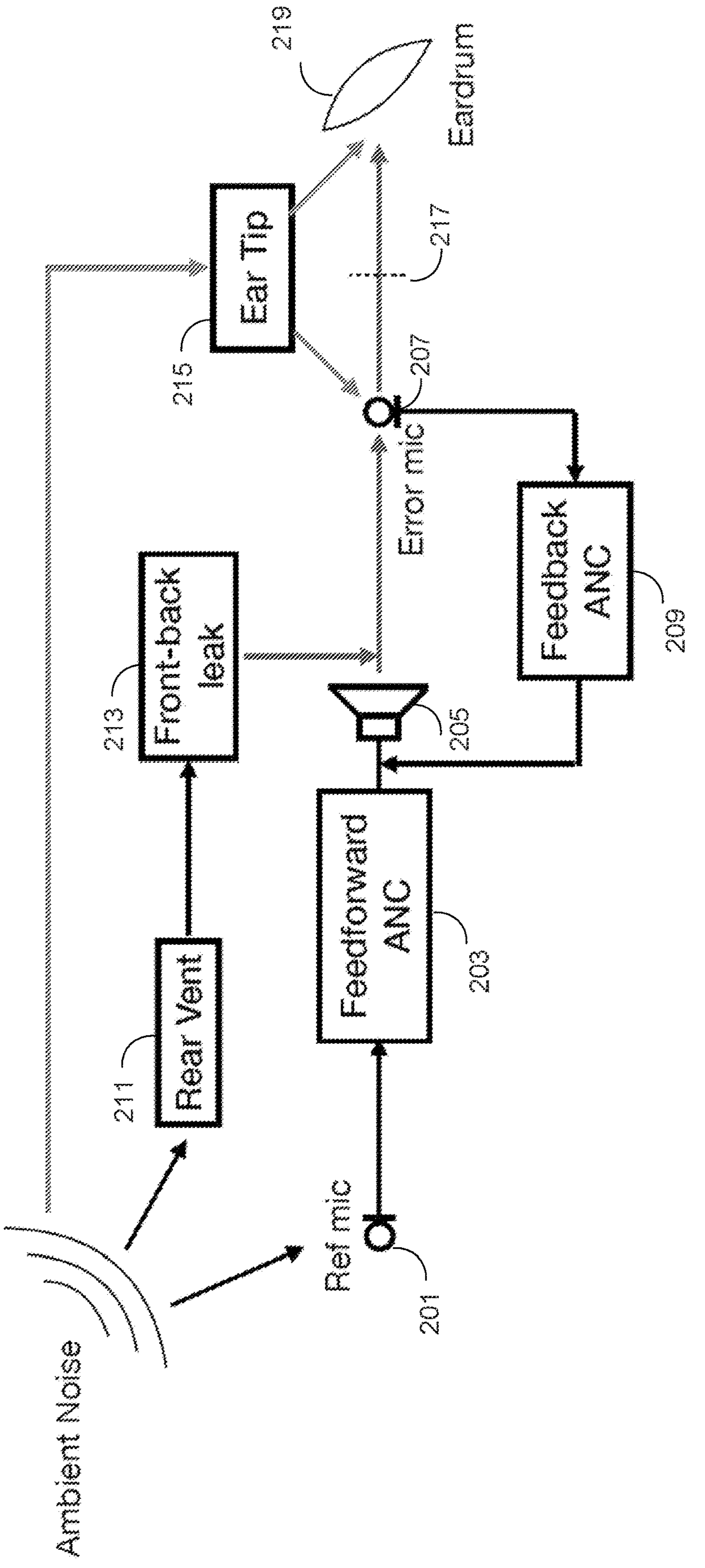
FIG. 2 depicts an acoustic propagation model of the multi-path ambient noise leaking through the passive isolation and the rear vent of an earphone to the eardrum and the partial loss of the acoustic pressure of the anti-noise signal across a housing mesh between the error microphone and the eardrum when the earphone uses an ANC operation to attenuate the ambient noise at the error microphone.

FIG. 2 depicts an acoustic propagation model of the multi-path ambient noise leaking through the passive isolation and the rear vent of an earphone to the eardrum and the partial loss of the acoustic pressure of the anti-noise signal across a housing mesh between the error microphone and the eardrum when the earphone uses an ANC operation to attenuate the ambient noise at the error microphone. While the ANC operation shows a hybrid topology that includes a feed forward loop and a feedback control loop, the ANC topology may include just the feed forward loop or the feedback loop.

A reference microphone 201, positioned at an opposite end of the earphone housing from a speaker driver 205 and an error microphone 207, captures the ambient noise or acoustic disturbance as a reference noise signal prior to its passing into the ear canal. An adaptive filter 203 of the feed forward loop may process the reference noise signal from reference microphone 201 to generate one component of the anti-noise signal driven from speaker 205. An adaptive filter 209 of the feedback loop may process the residual or error noise captured by error microphone 207, where the residual or error noise is the result of the destructive interference of the anti-noise signal and the ambient noise that has leaked into the ear canal, to generate another component of the anti-noise signal. The outputs from feed forward adaptive filter 203 and feedback adaptive filter 209 are summed before being driven as the anti-noise from speaker 205. Although not shown, speaker 205 may also drive streaming media content for playback, responses from voice queries or voice communication signals of remote parties in telephony or video calls.

The ambient noise may enter the ear canal through multiple paths. One multi-path component of the ambient noise may enter the ear canal via a rear vent 211 on the housing of the earphone through error microphone 207 and through a housing mesh 217 of ear-tip 215 used to protect the earphone against environmental ingress in a leakage path referred to as front-back leak 213 (see also FIG. 1 showing the propagation path of the noise from the rear vent into the ear canal). The propagation path of the ambient noise in front-back leak 213 from speaker 205 to eardrum 219 may be the same as the propagation path of the anti-noise from speaker 205 to eardrum 219. Another multi-path component of the ambient noise may enter the ear canal through the seal between ear-tip 215 and the ear canal in an ear-tip leakage path. One component of the noise in the ear-tip leakage path may enter the earphone through mesh 217 and be captured by error microphone 207. Another component of the noise in the ear-tip leakage path may propagate to eardrum 219 (see also FIG. 1 for the ear-tip leakage path). For the anti-noise, the resistivity of mesh 217 compared to the impedance of the propagation path to eardrum 219 may cause a pressure drop of the anti-noise across mesh 217. The transfer function of the propagation path of the ambient noise in the ear-tip leakage path to eardrum 219 may be different from that of the anti-noise. As a result, there is acoustic decoupling between error microphone 207 and eardrum 219. The mismatch in the acoustic path transfer function of the ambient noise and the anti-noise from error microphone 207 to eardrum 219 may cause a difference in the effect of the noise cancellation at error microphone 207 and at eardrum 219.

Figure 3:
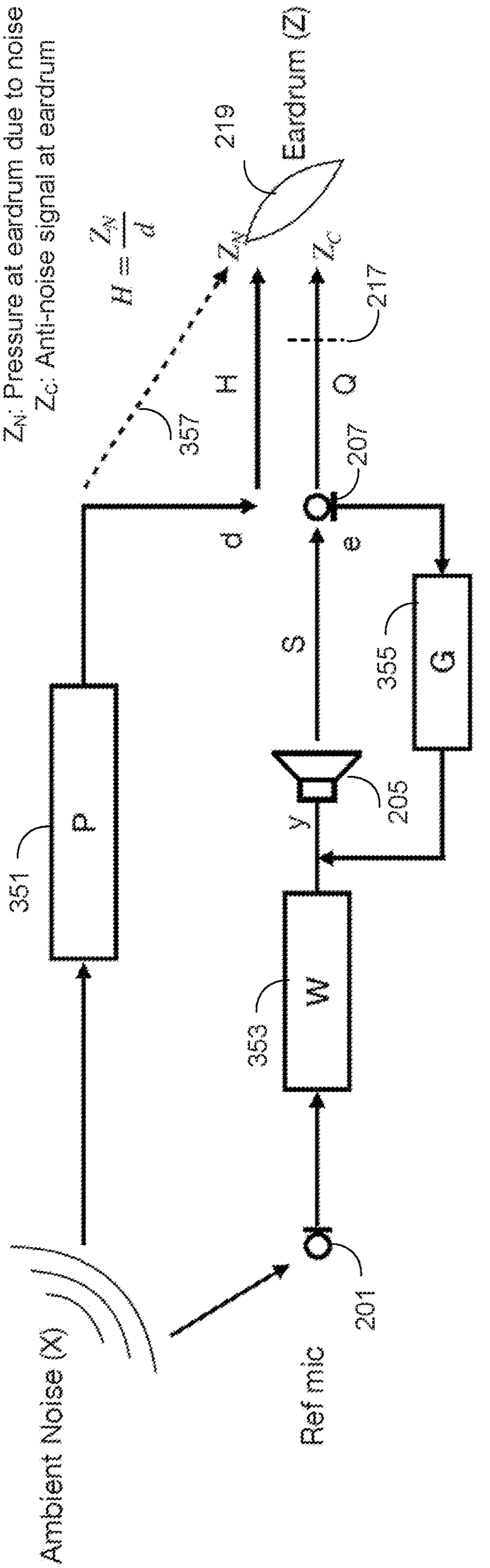
FIG. 3 depicts a signal model of the multi-path ambient noise to the eardrum in an earphone with ANC mechanism showing the acoustic transfer function of the ambient noise leaking through the earphone to the eardrum and the acoustic transfer function of the anti-noise signal from the speaker to the eardrum across the mesh according to one aspect of the disclosure.

FIG. 3 depicts a signal model of the multi-path ambient noise to the eardrum in an earphone with ANC mechanism showing the acoustic transfer function of the ambient noise leaking through the earphone to the eardrum and the acoustic transfer function of the anti-noise signal from the speaker to the eardrum across the mesh according to one aspect of the disclosure. In the signal model of FIG. 3, the multi-path noise of the front-back leak 213 and the ear-tip leakage path of FIG. 2 have been combined into a single primary acoustic path P 351 that models the transfer function of the ambient noise x into the ear canal. The noise output from primary acoustic path P 351 is referenced as disturbance d and may be expressed as (P*X).

The acoustic path for disturbance d from error microphone 207 to eardrum 219 is modeled by the transfer function H. The acoustic pressure of disturbance d that reaches eardrum 219 is referenced as $Z_N$. Transfer function H may model the multi-path propagation 357 of disturbance d in the ear canal from error microphone 207 to eardrum 219. In one aspect, transfer function H may represent in the frequency domain the impulse response of the noise at eardrum 219 and may be expressed as a ratio of eardrum noise $Z_N$ to disturbance d in amplitude and phase over the range of audio frequencies.

The adaptive filter 203 of the feed forward loop of FIG. 2 operating on the reference noise signal from reference microphone 201 is modeled by the transfer function W 353. The adaptive filter 209 of the feedback loop of FIG. 2 operating on the error noise (referenced as e) from error microphone 207 is modeled by transfer function G 355. The outputs from the feed forward loop and the feedback loop are summed as drive signal Y for speaker 205. The acoustic path of the anti-noise signal driven from speaker 205 to error microphone 207 is modeled by the secondary channel transfer function S. The error noise e thus represents the destructive interference of the anti-noise signal with disturbance d at error microphone 207 and may be expressed as [(P*X)−(S*Y)].

The acoustic path for the anti-noise signal from error microphone 207 to eardrum 219 is modeled by the transfer function Q. The acoustic pressure of the anti-noise signal that reaches eardrum 219 is referenced as $Z_C$. As discussed in FIG. 2, the anti-noise from speaker 205 may experience a drop in its acoustic pressure due to mesh 217. The diminished transfer function Q resulting from the partial pressure drop of the anti-noise contributes to the mismatch between the transfer functions H and Q. In one aspect, transfer function Q may represent in the frequency domain the impulse response of the anti-noise signal at eardrum 219 and may be expressed as a ratio of the anti-noise signal at eardrum noise $Z_C$ to the anti-noise signal at error microphone 207 in amplitude and phase over the range of audio frequencies. Due to the multi-path propagation 357 of disturbance d in the ear canal to eardrum 219 and the partial pressure drop of the anti-noise across the mesh 217, transfer function H for disturbance d and transfer function Q for the anti-noise signal may be different, resulting in a difference in the effect of noise cancellation at error microphone 207 and at eardrum 219. For simplicity, the signal model assumes perfect coherence at every point in the signal flow.

Figure 4:
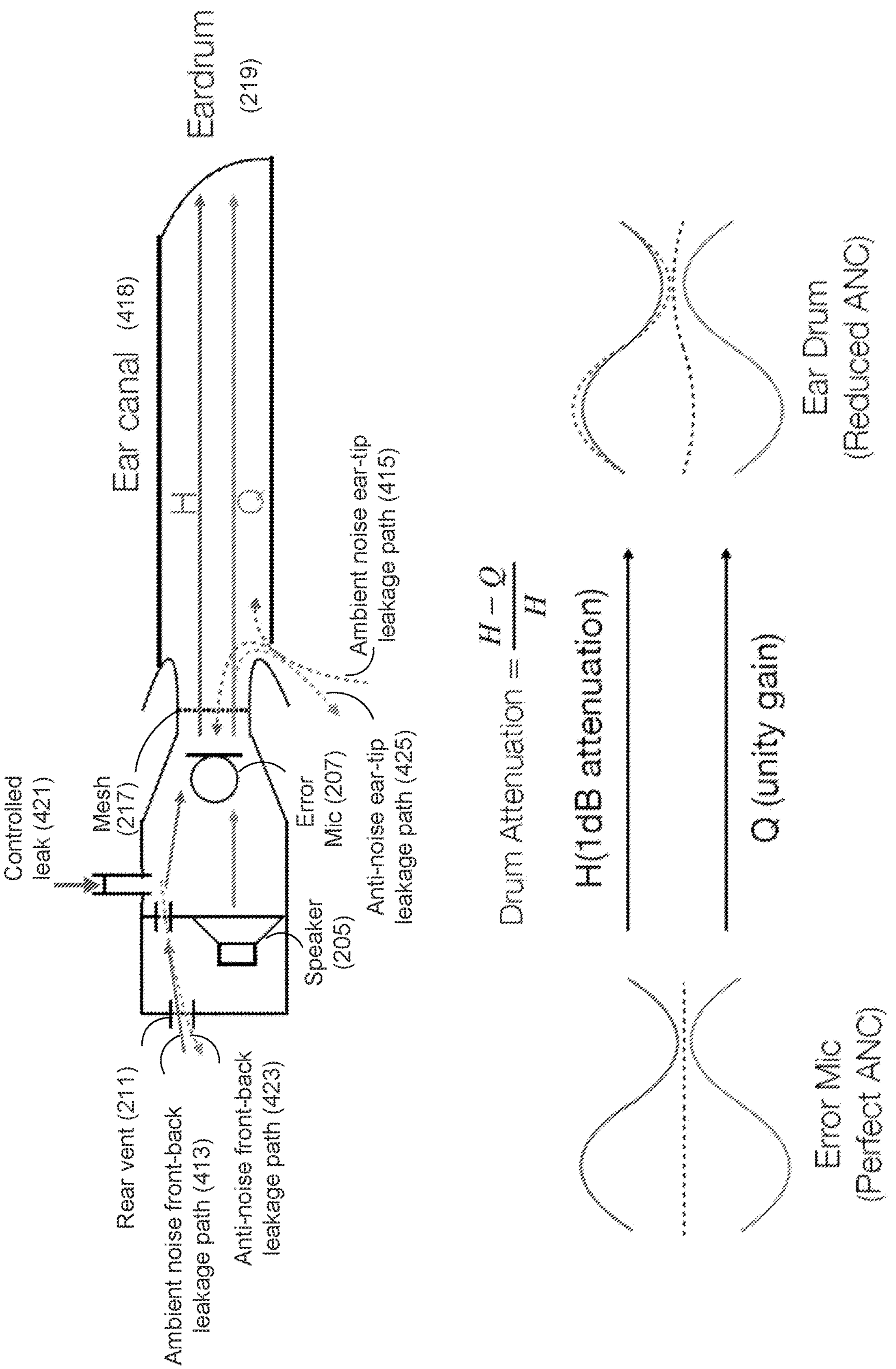
FIG. 4 depicts how a mismatch between the acoustic transfer functions of the ambient noise and the anti-noise signal from the error microphone to the eardrum due to the multiple leakage paths of the ambient noise and the partial loss of the acoustic pressure of the anti-noise due to the mesh may affect the noise cancellation at the eardrum according to one aspect of the disclosure.

FIG. 4 depicts how a mismatch between the acoustic transfer functions of the ambient noise and the anti-noise signal from the error microphone to the eardrum due to the multiple leakage paths of the ambient noise and the partial loss of the acoustic pressure of the anti-noise due to the mesh may affect the noise cancellation at the eardrum according to one aspect of the disclosure. The ambient noise may enter ear canal 418 through a front-back leakage path 413 via rear vent 211 and mesh 217 on ear-tip 215 of the earphone. The ambient noise may also enter ear canal 418 through an ear-tip leakage path 415 via a gap in the seal between the ear-tip and ear canal 418 or through a controlled leakage path 421. Some of the ambient noise of ear-tip leakage path 415 may enter the earphone through mesh 217 to be captured by error microphone 207. In one aspect, the ambient noise through controlled leakage path 421 may dominate over the ambient noise through rear vent 211 and may be comparable to the parasitic leakage due to the ear-tip leakage path 415 when the earphone is loosely worn.

Conversely, the anti-noise signal emitted by speaker 205 may leak from ear canal 418 through multiple leakage paths. For example, the anti-noise may leak from ear canal 418 through an ear-tip leakage path 425 via the gap in the seal between ear-tip 215 and ear canal 418, the same gap traversed by the ambient noise to enter ear canal 418 through ear-tip leakage path 415. The anti-noise may also leak from ear canal 418 through a front-back leakage path 423 via rear vent 211. The anti-noise signal may experience a partial pressure across mesh 217 due to resistivity of mesh 217 compared to the impedance of the propagation path to eardrum 219. In one aspect, the partial loss of the acoustic pressure of the anti-noise due to mesh 217 may dominate over the loss due to the other leakage paths. Due to the acoustic leaks at ear-tip 215 and the multiple leakage paths, there is a mismatch in the acoustic path transfer function H for noise and the acoustic path transfer function Q for anti-noise from error microphone 207 to eardrum 219.

If the feed forward loop of the ANC (e.g., transfer function W 353 of the adaptive filter in FIG. 3) is optimized to cancel ambient noise at error microphone 207, the maximum attenuation of the ambient noise at eardrum 219 may be a function of the mismatch between the transfer functions for H and Q. In one aspect, assuming perfect coherence and causality in the signal model (e.g., the simplified signal model of FIG. 3), it may be shown that the theoretical maximum attenuation of the ambient noise at eardrum 219 is:

$$\text{Maximum Eardrum Attenuation} = \frac{H - Q}{H} \qquad \text{(Equation 1)}$$

In one aspect, it may also be shown that the feedback loop of the ANC (e.g., transfer function G 355 of the adaptive filter in FIG. 3) does not affect the result of equation 1.

FIG. 4 illustrates that when the ANC operation is targeted to minimize the attenuated noise at error microphone 207, the anti-noise acoustic wave would ideally have the proper amplitude and phase to completely cancel the ambient noise at error microphone 207. For example, referring to FIG. 3, if the transfer function W 353 of the adaptive filter is optimized to −P/S, the error noise e at error microphone 207, expressed as [(P+(S*W))*X], may be minimized to 0. However, referring back to FIG. 4, if a mismatch between the transfer functions for H and Q results in a 1 dB attenuation in the ambient noise relative to the anti-noise, the anti-noise acoustic wave may not completely cancel the ambient noise at eardrum 219, resulting in residual noise heard by the wearer of the earphone. Thus, a slight difference in the transfer functions for H and Q may significantly limit the performance of the ANC operation.

The acoustic channel of the anti-noise from the speaker to the error microphone may be modeled by the secondary channel transfer function S (e.g., see FIG. 3). When there is an ideal seal between the ear-tip and ear canal (e.g., no ambient noise ear-tip leakage path 415 of FIG. 4) and there is no controlled leakage path, the transfer function S may show a magnitude of 10 dB at 100 Hz that is invariant to geometry of the ear canal. In one aspect, as there is progressively more leakage, the magnitude of S decreases, particularly in the lower acoustic frequency range. Thus, estimates of the deviation of the magnitude of the secondary channel transfer function from the ideal seal scenario may be a measure of the level of leakiness of the passive noise isolation at the ear-tip and through the controlled leakage path. Such leakage also affects the mismatch in the transfer functions between H and Q from the error microphone to the eardrum, which in turn affects the theoretical maximum attenuation of the ambient noise at the eardrum as shown by Equation 1.

In one aspect, the level of noise leakage affects the maximum attenuation of the noise achievable at the eardrum from the ANC operation due to the mismatch between the acoustic transfer function H of the ambient noise and the acoustic transfer function Q of the anti-noise signal from the error microphone to the eardrum. The maximum attenuation of the noise at the eardrum may represent the theoretical upper-bound on the performance of the ANC at the eardrum due to the mismatch in the transfer functions for H and Q.

In one aspect, as there is progressively more noise leakage, the magnitude of the maximally attenuated noise at the eardrum increases across the frequency range. It may be shown that among "good fits" of the earphone in the ear canal, every 0.5 dB increase in leakage may lead to a 2-4 dB reduction in the maximum attenuation of noise achievable at the eardrum, thus resulting in a 2-4 dB increase in the magnitude of the minimum residual noise at the eardrum across the frequency range. This theoretical upper-bound on the performance of the ANC at the eardrum due to leakage has been verified by measurement results for frequencies below 400 Hz. In one aspect, the ANC operation may modify the transfer function of the feed forward loop to compensate for the difference in the performance of the ANC between the eardrum and the error microphone.

The effect of various levels of noise leakage on the adaptive filter of the feed forward loop of the ANC operation may be quantized when comparing attenuating noise at the error microphone versus attenuating noise at the eardrum. Transfer function We may represent the theoretical magnitude of the transfer function of the feed forward loop of the ANC (e.g., transfer function W 353 of the adaptive filter in FIG. 3) when the ANC is optimized to cancel the ambient noise at the error microphone. As discussed in FIG. 4, We may be expressed as:

$$W_e = -\frac{P}{S} \qquad \text{(Equation 2)}$$

In one aspect, as there is progressively more leakage, resulting in increasing P for the transfer function of the ambient noise, and decreasing S for the transfer function of the anti-noise, the magnitude of We may increase.

On the other hand, when the adaptive filter of the feed forward loop is optimized to attenuate the ambient noise at the eardrum, the transfer function may exhibit different characteristics. $W_{z(FB)}$ may represent the theoretical magnitude of the transfer function of the feed forward loop of the ANC when the ANC is optimized to cancel the ambient noise at the eardrum. In one aspect, transfer function $W_{z(FB)}$ may be expressed as:

$$W_{Z(FB)} = -\frac{P}{S} * \frac{H_{FB}}{Q} \text{ where } H_{FB} = H + G * S * (Q - H) \qquad \text{(Equation 3)}$$

The $H_{FB}$ may model the transfer function of the noise from the error microphone to the eardrum due to the multiple leakage paths of the noise.

In one aspect, as there is progressively more leakage, the magnitude of $W_{z(FB)}$ may also increase. It may be shown that for a given leakage, $W_{z(FB)}$ optimized for the eardrum may have more gain with respect to the We optimized for the error microphone for a significant range of frequencies. It may also be shown that $W_{z(FB)}$ has a leading phase with respect to We. The difference in gain between $W_{z(FB)}$ and We may be a function of the level of noise leakage. For example, as there is progressively more leakage, the difference in gain between $W_{z(FB)}$ and We increases. This difference may be considered a bias to be applied to the adaptive filter of the feed forward loop to minimize the noise at the eardrum because the ANC has visibility only to the error noise at the error microphone. In one aspect, the bias may include differences in the phase between $W_{z(FB)}$ and We as a function of the level of noise leakage. In one aspect, the ANC operation may estimate the level of noise leakage based on the measured magnitude of the adaptive filter of the feed forward loop when the ANC is optimized to minimize the error noise at the error microphone. The ANC may then estimate the bias to be applied to the feed forward loop based on the estimated level of noise leakage to minimize the noise at the eardrum.

In one aspect, the bias for different levels of noise leakage may be determined in an offline process before the operation of the ANC. During the online operation of the ANC when the ANC adaptively changes the feed forward loop to minimize the error noise at the error microphone, the ANC may estimate the noise leakage based on the gain of the feed forward loop. The ANC may then estimate the bias based on the estimated noise leakage and the calibrated relationship between the noise leakage and the bias. The estimated bias may be applied to the gain of the adaptive filter of the feed forward loop to minimize the noise at the eardrum.

Figure 5:
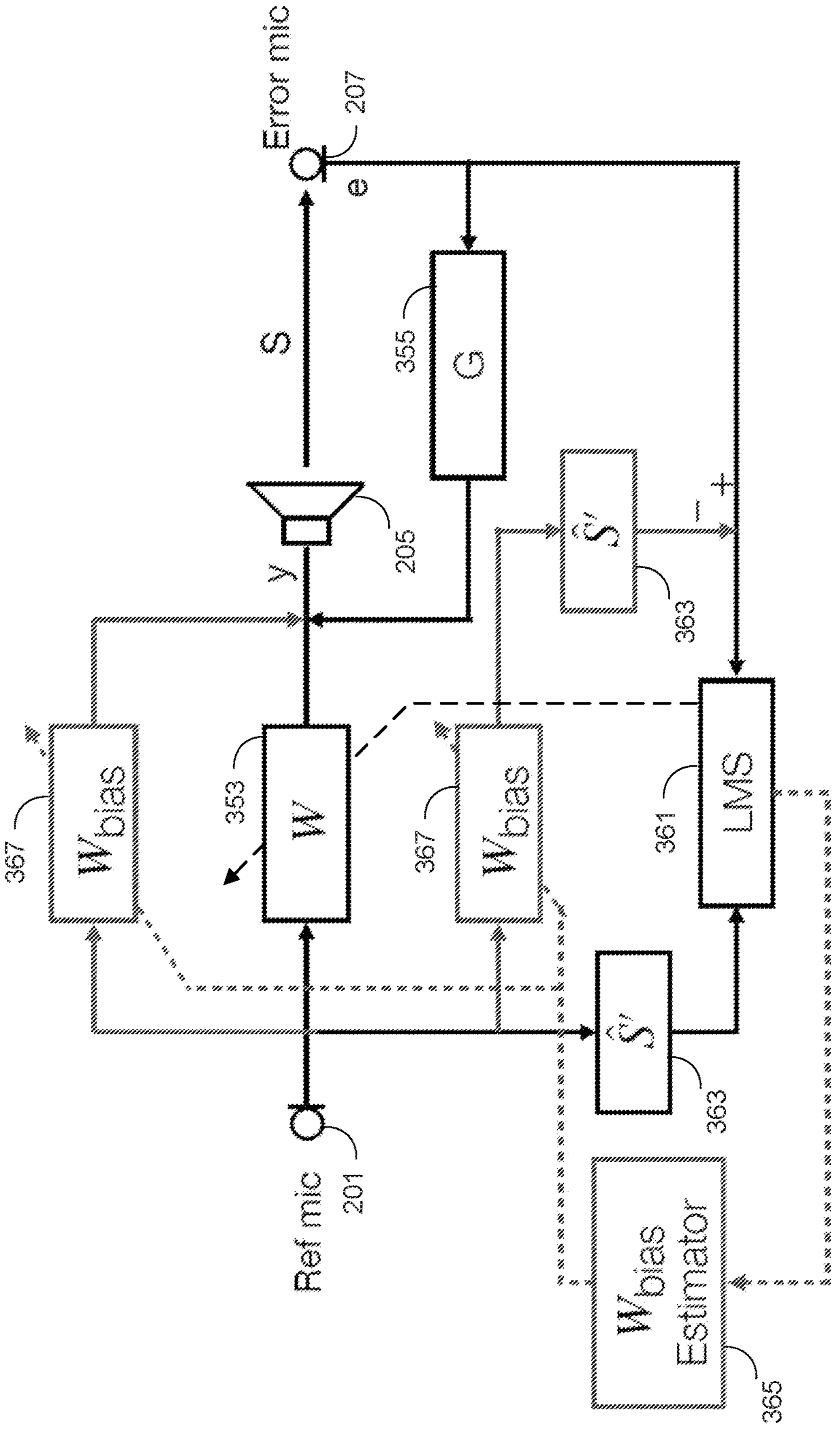
FIG. 5 depicts a functional block diagram of the ANC operation that adaptively introduces a bias to the gain of the adaptive filter of the feed forward loop to minimize noise at the eardrum according to one aspect of the disclosure.

FIG. 5 depicts a functional block diagram of the ANC operation that adaptively introduces a bias to the gain of the adaptive filter of the feed forward loop to minimize noise at the eardrum according to one aspect of the disclosure. Similar to FIG. 3, the adaptive filter W 353 of the feed forward loop operates on the reference noise signal from the reference microphone 201. The adaptive filter G 355 of the feedback loop operates on the error noise e from the error microphone 207. The W 353 and G 355 may also represent the transfer function of the respective adaptive filter. The outputs from adaptive filter W 353 of the feed forward loop and adaptive filter G 355 of the feedback loop are summed as drive signal Y for speaker 205. The acoustic signal driven from speaker 205 may represent the anti-noise signal and the acoustic path of the anti-noise signal from speaker 205 to error microphone 207 is modeled by the secondary channel transfer function S. Although not shown, speaker 205 may also drive streaming media content during playback sessions, responses from voice queries or voice communication signals of remote parties in telephony or video calls.

A least mean-squared (LMS) controller 361 may control (e.g., adjust the coefficients of) the adaptive filter W 353 to adapt to an error term (e.g., to minimize the error term in the least mean-squared sense) injected into the LMS controller 361. When the ANC operation is targeted to minimize the noise at error microphone 207, this error term may be the error noise e from error microphone 207. Adaptive filter W 353 may converge to −P/S when the error noise e is minimized. Other adaptive filter algorithms may be used. In doing so, LMS controller 361 may use a digitally filtered version of the reference noise signal from reference microphone 201, for example the reference noise filtered with $\hat{S}'$ 363, which is a model or estimate of the secondary channel transfer function S. In one aspect, filter $\hat{S}'$ 363 may be estimated by the LMS controller 361, or alternatively using another adaptive filter algorithm not shown, when input audio signals such as user content or playback signal is output from speaker 205. When the ANC operation is targeted to minimize the noise at the eardrum, modifications are made to the error noise e injected into LMS controller 361 and to the gain of the feed forward loop.

To minimize the noise at the eardrum, the LMS controller 361 may output the magnitude of the gain of adaptive filter W 353 for a $W_{bias}$ estimator module 365 to estimate the bias term that may be added to the gain of adaptive filter W 353. In one aspect, $W_{bias}$ estimator module 365 may estimate the level of noise leakage based on the magnitude of the gain of adaptive filter W 353 and the determined or calibrated relationship between the theoretical or measured magnitude of the gain of adaptive filter W 353 and the noise leakage. $W_{bias}$ estimator module 365 may then estimate the bias term based on the estimated level of noise leakage and the determined or calibrated relationship between the noise leakage and the bias term. In one aspect, $W_{bias}$ estimator module 365 may estimate the bias term based on the magnitude of the gain of adaptive filter W 353 and the determined or calibrated difference between the adaptive filter W 353 optimized to reduce noise at error microphone 207 and at the virtual microphone of the eardrum.

The ANC operation may apply the bias filter $W_{bias}$ 367 to the reference noise signal from reference microphone 201 to generate an explicit bias term that is added to the output of adaptive filter W 353 to generate the drive signal Y from speaker 205. To keep the LMS controller 361 from removing this introduced bias to the feed forward loop, the reference noise signal may be filtered by $W_{bias}$ 367 and $\hat{S}'$ 363 to estimate the change to the error noise e at error microphone 207 due to the introduced bias term. The ANC operation may subtract this estimated change to the error noise e at the error microphone 207 from the error signal e to generate the error term injected into the LMS controller 361 so that adaptive filter W 353 may converge to −P/S and the gain of the feed forward loop including adaptive filter W 353 and $W_{bias}$ 367 may approach $W_{z(FB)}$ as a function of the noise leakage. The ANC operation may thus adaptively introduce a bias term to the adaptive filter W 353 of the feed forward loop to compensate for a difference in the effect of the noise cancellation at the eardrum and at error microphone 207.

Figure 6:
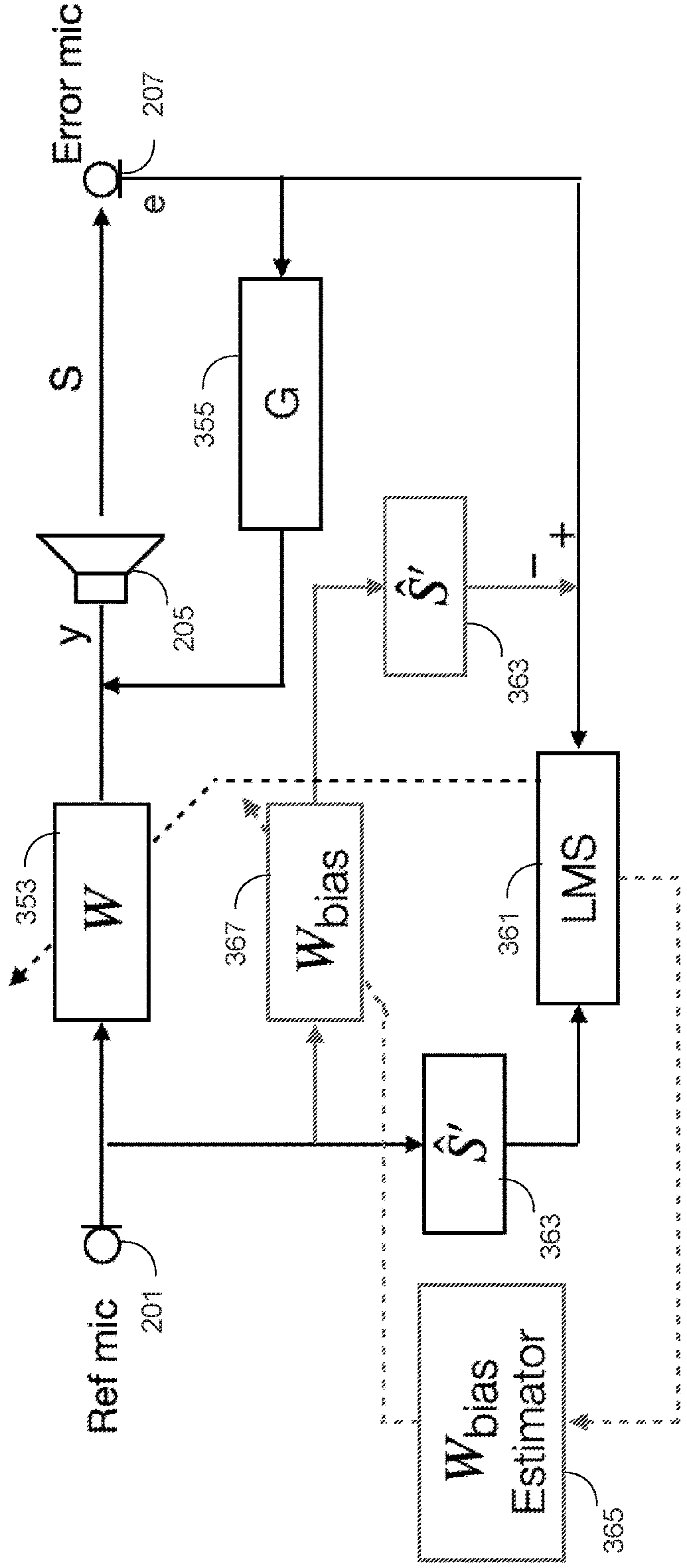
FIG. 6 depicts a functional block diagram of the ANC operation that adaptively introduces a bias to the gain of the adaptive filter of the feed forward loop to minimize noise at the eardrum according to another aspect of the disclosure.

FIG. 6 depicts a functional block diagram of the ANC operation that adaptively introduces a bias to the gain of the adaptive filter of the feed forward loop to minimize noise at the eardrum according to another aspect of the disclosure. Modules in FIG. 6 having the same reference identifiers as those in FIG. 5 operate as already described and will not be repeated for sake of brevity.

The functional block diagram of FIG. 6 differs from that of FIG. 5 in that a bias filter is not used to explicitly introduce a bias term to the output of adaptive filter W 353. However, when the bias term received at error microphone 207, as estimated by filtering the reference noise signal by $W_{bias}$ 367 and $\hat{S}'$ 363, is subtracted from the error signal e to generate the error term injected into the LMS controller 361, the LMS controller 361 may adapt W 353 to add in this bias term. The result is that adaptive filter W 353 may converge to the same transfer function as achieved by the feed forward loop of FIG. 5 (e.g., $-P/S+W_{bias}$ 367) regardless of whether an explicit bias term is added to the feed forward loop. The benefit of explicitly adding the bias term is that LMS controller 361 may save the time of re-adapting W 353 to introduce the bias term, potentially enabling a faster convergence of the feed forward loop.

Figure 7:
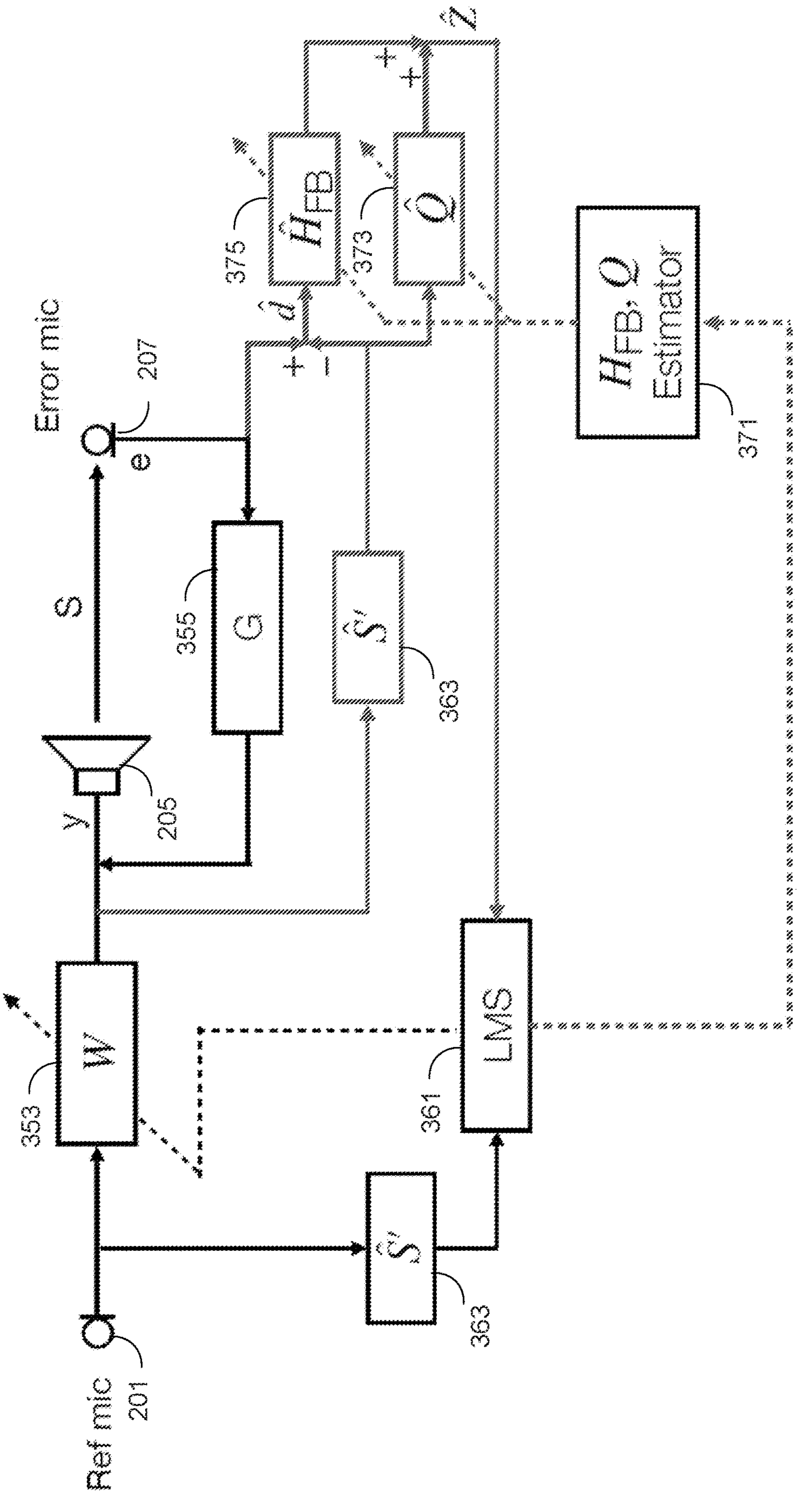
FIG. 7 depicts a functional block diagram of the ANC operation that modifies the error noise from the error microphone to generate an estimate of the attenuated noise at the eardrum to effectively introduce a bias to the gain of the adaptive filter of the feed forward loop to minimize noise at the eardrum according to one aspect of the disclosure.

FIG. 7 depicts a functional block diagram of the ANC operation that modifies the error noise from the error microphone to generate an estimate of the attenuated noise at the eardrum that is injected into the LMS controller to effectively introduce a bias to the gain of the adaptive filter of the feed forward loop to minimize noise at the eardrum according to one aspect of the disclosure. In FIG. 7, instead of estimating the bias term that may be added to the gain of the feed forward loop based on the magnitude of the gain of adaptive filter W 353 as in FIGS. 5 and 6, the ANC operation may estimate the attenuated noise at the eardrum resulting from the mismatch between the transfer function of the acoustic path for the leaked noise and the transfer function of the acoustic path for the anti-noise from the error microphone to the eardrum.

In one aspect, to minimize the noise at the eardrum, the LMS controller 361 may output the magnitude of the gain of adaptive filter W 353 for a $H_{FB}$ and Q estimator module 371 to estimate the transfer function $\widehat{H_{FB}}$ 375 of the acoustic path for the leakage noise from error microphone 207 to the eardrum due to the multiple leakage path and the transfer function $\hat{Q}$ 373 of the acoustic path for the anti-noise signal from error microphone 207 to the eardrum. The $\widehat{H_{FB}}$ 375 may estimate the $H_{FB}$ of Equation 3. In one aspect, $H_{FB}$ and Q estimator module 371 may estimate the level of noise leakage based on the magnitude of the gain of adaptive filter W 353 and the determined or calibrated relationship between the theoretical or measured magnitude of the gain of adaptive filter W 353 and the noise leakage. $H_{FB}$ and Q estimator module 371 may then estimate the transfer functions $\widehat{H_{FB}}$ 375 and $\hat{Q}$ 373 based on the estimated level of noise leakage and the determined or calibrated relationship between the noise leakage and the transfer functions.

The ANC operation may estimate the attenuated noise at the eardrum based on the estimated transfer function $\widehat{H_{FB}}$ 375 and $\hat{Q}$ 373. For example, the reference noise signal may be filtered by $\hat{S}'$ 363, an estimate of the secondary channel transfer function S, to estimate the anti-noise signal received by error microphone 207. The estimated anti-noise signal at error microphone 207 may be subtracted from the error signal e captured by error microphone 207 to estimate the leakage noise $\hat{d}$ at error microphone 207. The estimated noise $\hat{d}$ at error microphone 207 is filtered by $\widehat{H_{FB}}$ 375 to estimate the noise at the eardrum. To estimate the anti-noise signal at the eardrum, the reference noise signal may be filtered by $\hat{S}'$ 363 and $\hat{Q}$ 373. The ANC operation adds the estimated noise at the eardrum and the estimated anti-noise signal at the eardrum to estimate the attenuated noise $\hat{Z}$ at the eardrum. The estimated attenuated noise $\hat{Z}$ at the eardrum, also referred to the estimated error noise at the eardrum, is injected into LMS controller 361 so that adaptive filter W 353 may apply a bias to attempt to remove the estimated attenuated noise $\hat{Z}$ at the eardrum. The ANC operation may thus adaptively introduce a bias term to the adaptive filter W 353 of the feed forward loop to compensate for a difference in the effect of the noise cancellation at the eardrum and at error microphone 207.

Figure 8:
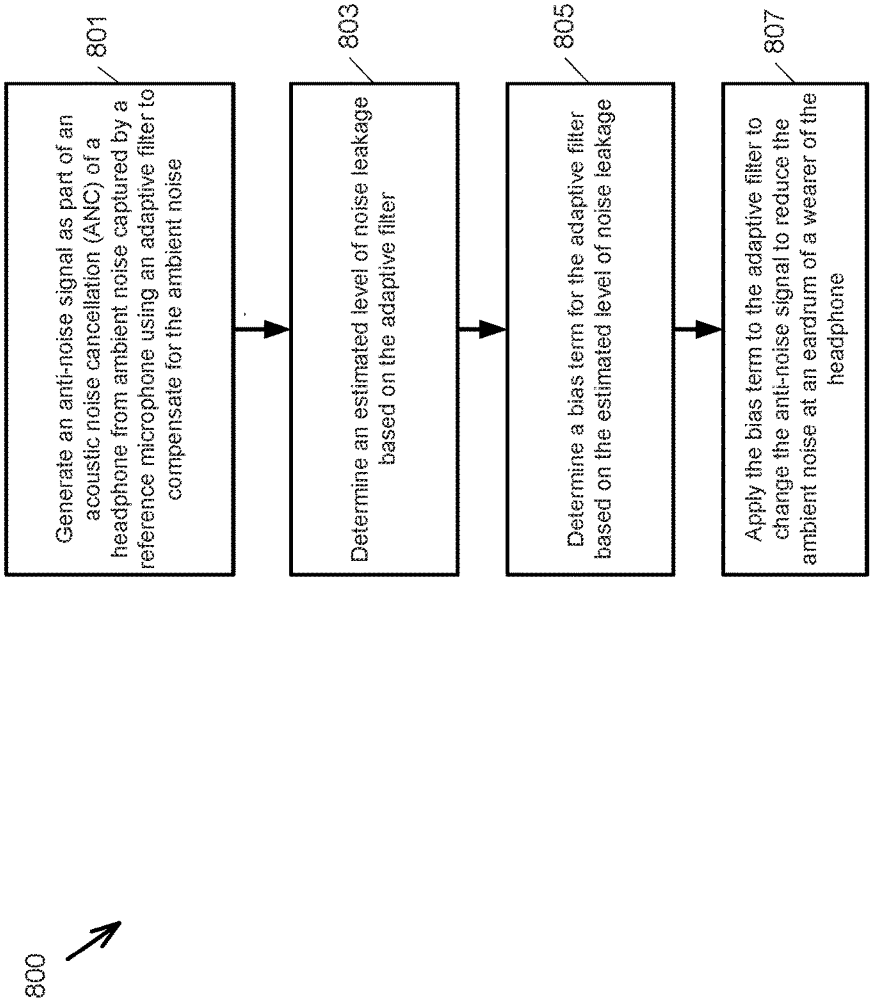
FIG. 8 is a flow diagram of a method for adaptively minimizing unwanted ambient noise at a virtual microphone located at the eardrum of the wearer of the earphone by introducing a bias to the adaptive filter of the feed forward control loop of the ANC operation according to one aspect of the disclosure.

FIG. 8 is a flow diagram of a method 800 for adaptively minimizing unwanted ambient noise at the eardrum of the wearer of the earphone by introducing a bias to the adaptive filter of the feed forward control loop of the ANC operation according to one aspect of the disclosure. Method 800 may be practiced by the ANC operations of FIG. 5, 6, or 7. In one aspect, method 800 may be extended to adaptive equalization applications at the ear drum by adjusting the adaptive filter of an adaptive equalization algorithm based on an error term derived from a residual noise captured by an error microphone to compensate for the frequency response variations between the ear drum and the error microphone.

In operation 801, the method 800 generates an anti-noise signal from ambient noise captured by a reference microphone of the earphone using the adaptive filter of the feed forward control loop to compensate for the ambient noise. An LMS controller may control (e.g., adjust the coefficients of) the adaptive filter to adapt to an error term derived from a residual noise signal or an error noise signal resulting from the destructive interference of the anti-noise signal with the ambient noise received at an error microphone.

In operation 803, the method 800 estimates a level of noise leakage in the earphone based on the adaptive filter. The level of noise leakage may estimate the ambient noise that has been received by the error microphone and that has leaked through a controlled leakage path or past the passive isolation formed with the ear-tip of the earphone and the ear canal of a wearer of the earphone.

In operation 805, the method 800 determines a bias term for the adaptive filter of the feed forward loop based on the estimated level of noise leakage. The bias term may represent the difference in the gain of the adaptive filter when the ANC operation targets the attenuation of the ambient noise at the ear drum of a wearer of the earphone rather than at the error microphone. In one aspect, the bias term may be estimated based on the estimated level of noise leakage and the determined or calibrated relationship between the noise leakage and the bias term. The bias term may be explicitly added to the output of the adaptive filter or the adaptive filter may be adapted by the LMS controller to introduce the bias term. In one aspect, the LMS controller may adapt the adaptive filter to introduce the bias term when the error term injected into the LMS controller is modified to generate an estimate of the destructive interference of the anti-noise signal with the ambient noise received at the virtual microphone.

In operation 807, the method applies the bias term to the adaptive filter of the feed forward loop to change the anti-noise signal to reduce the ambient noise received at the ear drum rather than at the error microphone.

Embodiments of the ANC operation to minimize the ambient noise at a virtual microphone located at the eardrum rather than at the error microphone described herein may be implemented in a data processing system, for example, by a network computer, network server, tablet computer, smartphone, laptop computer, desktop computer, other consumer electronic devices or other data processing systems. In particular, the operations described for determining the best communication mode for use by a wearable audio output device are digital signal processing operations performed by a processor that is executing instructions stored in one or more memories. The processor may read the stored instructions from the memories and execute the instructions to perform the operations described. These memories represent examples of machine readable non-transitory storage media that can store or contain computer program instructions which when executed cause a data processing system to perform the one or more methods described herein. The processor may be a processor in a local device such as a smartphone, a processor in a remote server, or a distributed processing system of multiple processors in the local device and remote server with their respective memories containing various parts of the instructions needed to perform the operations described.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

While certain exemplary instances have been described and shown in the accompanying drawings, it is to be understood that these are merely illustrative of and not restrictive on the broad invention, and that this invention is not limited to the specific constructions and arrangements shown and described, since various other modifications may occur to those of ordinary skill in the art. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112 (f) unless the words “means for” or “step for” are explicitly used in the particular claim.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method for performing adaptive noise cancellation (ANC) for an earphone, the method comprising:
- generating, using an adaptive filter of the ANC, an anti-noise signal from ambient noise captured by a reference microphone of the earphone to attenuate leakage noise from the ambient noise, wherein the adaptive filter is being updated by an adaptive filter controller;
- determining an estimated level of the leakage noise based on the adaptive filter;
- determining a bias term for the adaptive filter based on the estimated level of the leakage noise;
- applying the bias term to the adaptive filter to change the anti-noise signal to attenuate the leakage noise received at an ear drum of a user wearing the earphone; and
- reducing an error term that is being input to the adaptive filter controller, the error term comprises an error noise signal captured by an error microphone, wherein the error term is reduced by subtracting an estimated change to the error noise signal that is due to the bias term being applied to the adaptive filter.

2. The method of claim 1, wherein applying the bias term comprises:
- adjusting a gain of the adaptive filter for generating the anti-noise signal to attenuate the leakage noise at the eardrum.

3. The method of claim 2, wherein applying the bias term further comprises:
- adapting a transfer function of the adaptive filter by a least-mean-squared (LMS) algorithm to drive the error term toward zero.

4. The method of claim 2, wherein the error term comprises the error noise signal captured by the error microphone modified to estimate an attenuated noise resulting from the leakage noise attenuated by the anti-noise signal at the ear drum.

5. The method of claim 1, wherein determining the estimated level of the leakage noise comprises:
- determining a relationship between a magnitude of a gain of the adaptive filter, when the adaptive filter is adapted to attenuate the leakage noise at an error microphone, and the leakage noise for a range of levels of the leakage noise; and estimating the level of the leakage noise in the earphone based on the relationship and the magnitude of the gain of the adaptive filter when the adaptive filter is adapted to reduce the leakage noise at the error microphone.

6. The method of claim 1, wherein determining the bias term for the adaptive filter comprises:

determining a relationship between a difference in a gain of the adaptive filter when the adaptive filter is adapted to attenuate the leakage noise at an error microphone and at the ear drum for a range of levels of the leakage noise; and estimating the bias term for the adaptive filter based on the relationship and the estimated level of the noise leakage.

7. The method of claim 1, wherein applying the bias term to the adaptive filter comprises:

generating an explicit bias to an output of the adaptive filter based on the bias term and the ambient noise captured by the reference microphone; and adding the explicit bias to the output of the adaptive filter to generate the anti-noise signal.

8. The method of claim 1, wherein applying the bias term to the adaptive filter comprises:

adapting a transfer function of the adaptive filter to introduce the bias term; and generating the anti-noise signal based on the transfer function that is adapted and the ambient noise captured by the reference microphone.

9. The method of claim 1, further comprising:

estimating a first transfer function of an acoustic path for the leakage noise from an error microphone to the ear drum based on the estimated level of the leakage noise;

estimating a second transfer function of an acoustic path for the anti-noise signal from the error microphone to the ear drum based on the estimated level of the leakage noise;

estimating an attenuated noise resulting from the leakage noise attenuated by the anti-noise signal at the ear drum based on the first transfer function, the second transfer function, and the error noise signal captured by the error microphone; and adapting a transfer function of the adaptive filter to drive the attenuated noise at the ear drum toward zero.

10. The method of claim 1, wherein applying the bias term to the adaptive filter to change the anti-noise signal to attenuate the leakage noise at the ear drum comprises attenuating the leakage noise at a virtual microphone that is virtually located at the ear drum.

11. A processor of an earphone, the processor configured to perform adaptive noise cancellation (ANC) comprising operations to:

generate, by an adaptive filter of the ANC, an anti-noise signal from ambient noise captured by a reference microphone of the earphone to attenuate leakage noise from the ambient noise, wherein the adaptive filter is being updated by an adaptive filter controller;

determine an estimated level of the leakage noise based on the adaptive filter;

determine a bias term for the adaptive filter based on the estimated level of the leakage noise;

apply the bias term to the adaptive filter to change the anti-noise signal to attenuate the leakage noise received at an eardrum of a wearer of the earphone; and reduce an error term that is being input to the adaptive filter controller, the error term comprises an error noise signal captured by an error microphone that results from the leakage noise attenuated by the anti-noise signal at the error microphone, wherein the error term is reduced by subtracting an estimated change to the error noise signal that is due to the bias term being applied to the adaptive filter.

12. The processor of claim 11, wherein to apply the bias term, the operations comprise:

adjust a gain of the adaptive filter to generate the anti-noise signal to attenuate the leakage noise at the ear drum.

13. The processor of claim 12, wherein the operations to apply the bias term comprise:

adapt a transfer function of the adaptive filter by a least-mean-squared (LMS) algorithm to drive the error term toward zero.

14. The processor of claim 12, wherein the error term comprises the error noise signal captured by the error microphone modified to estimate an attenuated noise resulting from the leakage noise attenuated by the anti-noise signal at the ear drum.

15. The processor of claim 11, wherein to determine the estimated level of the leakage noise, the operations comprise:

determine a relationship between a magnitude of a gain of the adaptive filter, when the adaptive filter is adapted to attenuate the leakage noise at an error microphone, and the leakage noise for a range of levels of the leakage noise; and estimate the level of the leakage noise in the earphone based on the relationship and the magnitude of the gain of the adaptive filter when the adaptive filter is adapted to reduce the leakage noise at the error microphone.

16. The processor of claim 11, wherein to determine the bias term for the adaptive filter, the operations comprise:

determine a relationship between a difference in a gain of the adaptive filter when the adaptive filter is adapted to attenuate the leakage noise at an error microphone and at the ear drum for a range of levels of the leakage noise; and estimate the bias term for the adaptive filter based on the relationship and the estimated level of the noise leakage.

17. The processor of claim 11, wherein the operations further comprise:

estimate a first transfer function of an acoustic path for the leakage noise from an error microphone to the ear drum based on the estimated level of the leakage noise;

estimate a second transfer function of an acoustic path for the anti-noise signal from the error microphone to the ear drum based on the estimated level of the leakage noise;

estimate an attenuated noise resulting from the leakage noise attenuated by the anti-noise signal at the ear drum based on the first transfer function, the second transfer function, and the error noise signal captured by the error microphone; and adapt a transfer function of the adaptive filter to drive the attenuated noise at the ear drum toward zero.

18. An earphone comprising:

a reference microphone configured to capture ambient noise;

a speaker configured to transmit an anti-noise signal to attenuate leakage noise from the ambient noise;

an error microphone configured to capture an error noise signal resulting from the leakage noise attenuated by the anti-noise signal;

a processor; and a memory coupled to the processor to store instructions, which when executed by the processor, cause the processor to perform adaptive noise cancellation (ANC) operations comprising:

generate, by an adaptive filter of the ANC operations, the anti-noise signal from the ambient noise captured by the reference microphone, wherein the adaptive filter is being updated by an adaptive filter controller;

determine an estimated level of the leakage noise based on the adaptive filter when the adaptive filter is adapted to reduce an error term derived from the error noise signal;

determine a bias term for the adaptive filter based on the estimated level of the leakage noise;

apply the bias term to the adaptive filter to change the anti-noise signal to attenuate the leakage noise received at an eardrum of a wearer of the earphone;

filter the ambient noise captured by the reference microphone, using the bias term and using a model or estimate of a secondary channel transfer function, to produce a bias term filtered-version of the ambient noise; and reduce an error term that is being input to the adaptive filter controller, by subtracting the bias term filtered-version of the ambient noise from an error noise signal captured by an error microphone.

* * * * *